United States Patent

[11] 3,612,298

| [72] | Inventor | Shiro Azuma<br>2-10-13 Higashimotomachi, Kokubunji, Tokyo, Japan |
|---|---|---|
| [21] | Appl. No. | 866,204 |
| [22] | Filed | Oct. 14, 1969 |
| [45] | Patented | Oct. 12, 1971 |
| [32] | Priority | Nov. 15, 1968 |
| [33] | | Japan |
| [31] | | 43-83267 |

[54] AUTOMATIC BAR-FEEDING APPARATUS
10 Claims, 8 Drawing Figs.

[52] U.S. Cl.............................................. 214/1.2,
82/2.5, 214/1.5
[51] Int. Cl............................................. B23q 5/22
[50] Field of Search........................................214/1.1–1.5;
82/2.5, 2.7

[56] References Cited
UNITED STATES PATENTS
| 3,042,251 | 7/1962 | Konrad..................... | 214/1.5 X |
| 3,360,139 | 12/1967 | Bechler..................... | 214/1.2 X |
| 3,419,160 | 12/1968 | Azuma....................... | 214/1.2 |

*Primary Examiner*—Gerald M. Forlenza
*Assistant Examiner*—Frank E. Werner
*Attorney*—Cecily L. Frey

ABSTRACT: Automatic bar-feeding apparatus having a pusher rod movable to and from a bar machine such as an automatic lathe, for feeding a bar material thereto, the pushing rod being driven by a motor at the initial stage of the feeding stroke and then by gravitational drive through the rest of the stroke, including the machining operation. Means are provided to prevent the bar material from being accelerated by the gravitational drive to strike against parts of the bar machine. The motor drive further functions, in cooperation with a clamping mechanism, to engage the bar material with the pusher rod at the beginning of the feeding stroke, and also to disengage the scrap end of the machined bar from the pusher rod at the end of its return stroke.

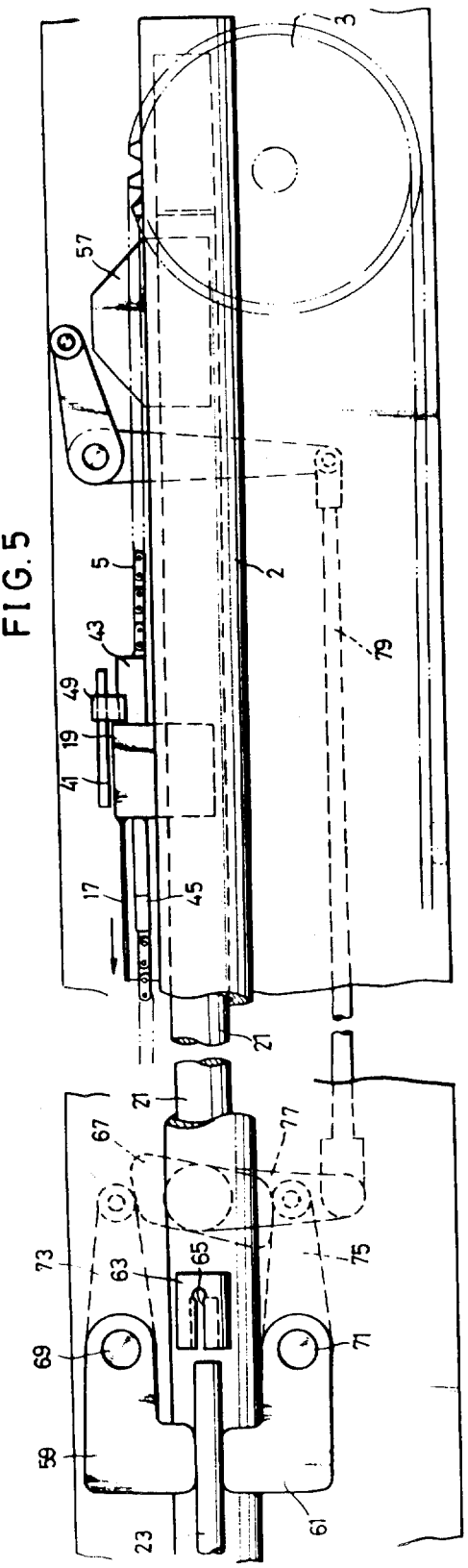
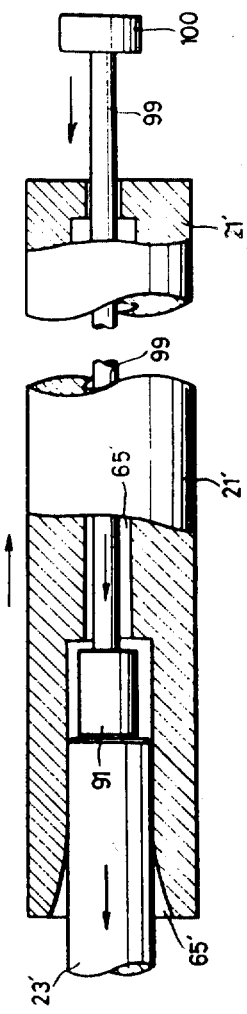
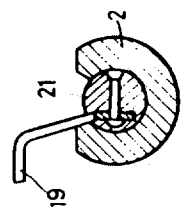
FIG. 5
FIG. 7
FIG. 6
INVENTOR
Shiro Azuma

AUTOMATIC BAR-FEEDING APPARATUS

This invention relates generally to a bar-feeding apparatus for a bar machine, and more particularly to an improved means for automatically feeding a bar material by means of a pusher rod mechanism which is driven by a motor and be the gravitational force of a weight.

In the hereto known prior art, two conventional systems are commonly known for feeding a bar material to a machining position by means of a pusher rod and for retracting the scrap end of the machined bar by the return motion of the pusher rod, the scrap end being eventually discarded from the feeding apparatus.

In one system, the pusher rod is advanced first by means of a motor and then a clutch connecting the pusher rod and the motor drive is disconnected to allow the pusher rod to be further advanced by gravitational force.

In the second system, the entire feeding stroke is controlled by a servomotor.

In the former system, the clutch is preset to be disconnected shortly before the machining operation starts. This however is a disadvantage in that nonuniform lengths of bars, which is generally the case, result in a variety of travel lengths of the bars after the clutch is disconnected, and the accelerated motion of the bats, generated by gravity of the weight, causes the bars to strike against a cutting tool of a machine of the type having a movable main spindle. The disadvantage in the latter system is that the expensive servomotor unfavorably affects the machine cost.

An object of the present invention is to provide means to avoid the above-described disadvantages, providing a bar-feeding apparatus which is applicable for various types of bar machines and is economically manufactured and maintained.

The bar-feeding apparatus of the present invention comprises a bar-clamping mechanism cooperating with a pusher rod. The clamping mechanism holds the bar material while the pusher rod is advanced by a motor and chain drive to forcibly connect itself with the bar material, the clamping mechanism being then opened to allow the pusher rod to advance the bar.

Upon completion of the engagement between the bar ad the pusher rod, the positive motor drive on the pusher rod is discontinued, allowing the pusher rod to be advanced by the force of gravity of a weight. The motor drive then functions to negatively govern the advancing speed of the pusher rod until the bar reaches the machining position with the speed regulated by the motor drive.

Upon completion of the machining operation the pusher rod is withdrawn by the reversed motor drive, together with the scrap end of the machined bar engaged at its front end. Near the end of the return stroke, the clamping mechanism is again actuated to hold the scrap end while the pusher rod further continues its return motion to forcibly disconnect itself from the scrap end.

The invention also provides various limit switch means for correlating the various operations of the apparatus.

The various objects, features and attendant advantages of the present invention will become more apparent from the following description of a preferred embodiment with the aid of the accompanying drawings, wherein:

FIG. 5 is a schematic view illustrating the functional operation of a clamping mechanism;

FIG. 6 is a partial sectional view illustrating the pusher rod in a guide tube with a wing plate fixed to the pusher rod;

FIG. 7 is a partial sectional view illustrating another embodiment of the pusher rod disengaging the scrap end of the bar material.

Figure 1:
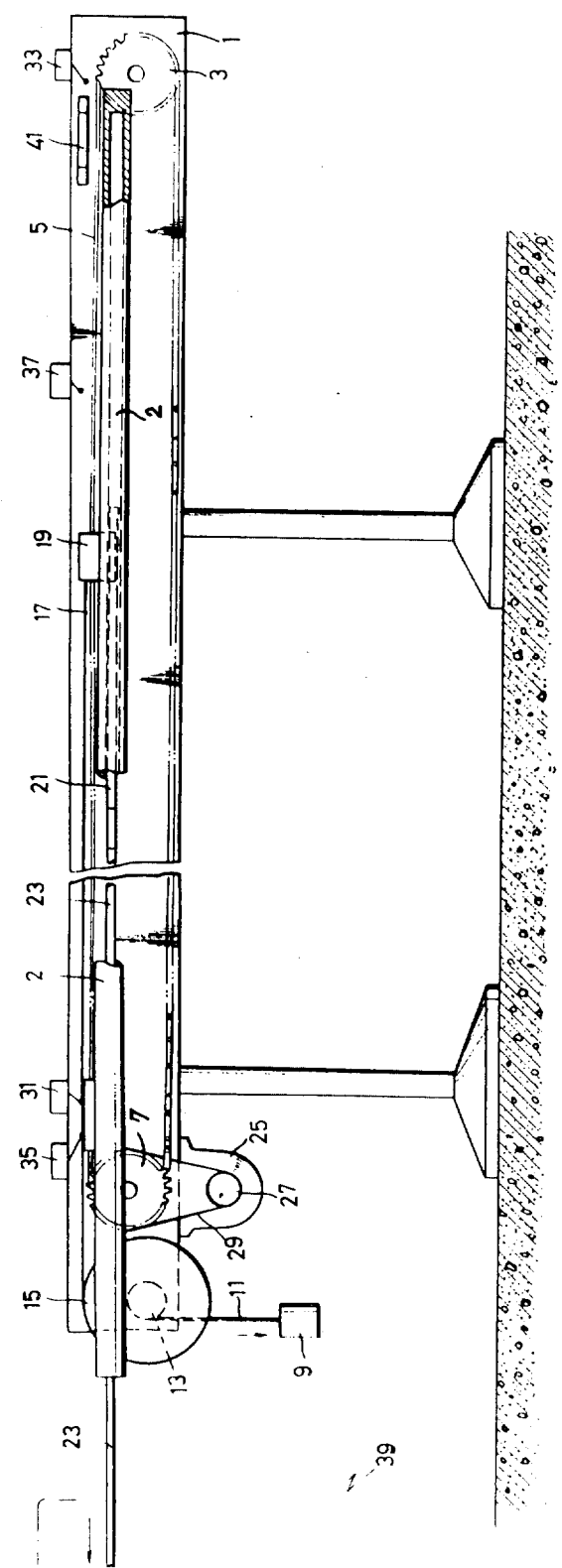
FIG. 1 is an overall side view of an exemplary embodiment of the automatic bar-feeding apparatus according to the present invention.
Figure 2:
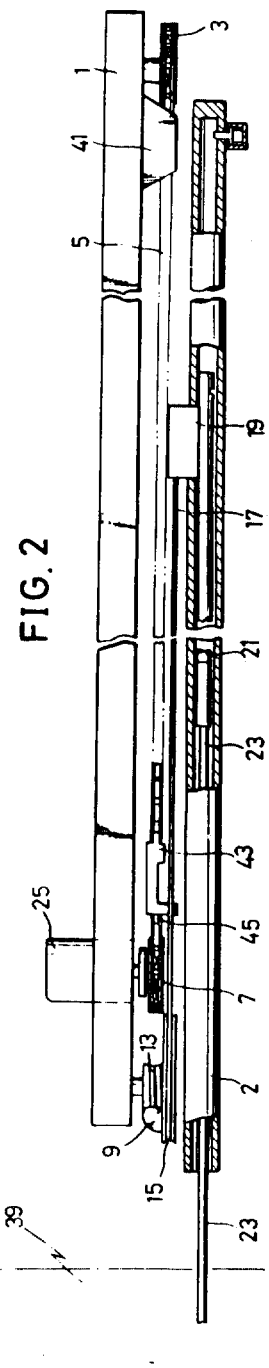
FIG. 2 is a plan view of the apparatus shown in FIG. 1.

Referring initially to FIGS. 1 and 2, numeral 1 denotes a frame of the apparatus, 2 is a tube for guiding a pusher rod 21 and a bar material 23 to be processed in the associated bar machine, for example a lathe, generally indicated by numeral 39. Numeral 3 denotes a rear sprocket mounted on frame 1 for a chain 5 having a corresponding front sprocket 7 also mounted on frame 1; numeral 9 denotes a weight attached to the end of a rope 11 to suspend the weight thereon, 13 and 15 denotes stepped pulleys for spooling up respective ropes 11 and 17; 19 is a wing plate fixed to pusher rod 21, 25 is a driving motor with a pulley 27, 29 denotes a belt about pulley 27.

Numeral 31 denotes a limit switch for sensing the completion of the machining and for reversing motor 25, 33 denotes a similar limit switch for sensing the completion of the return stroke of pusher rod 21. Switch 33 sends signals to stop motor 25 and to feed a new bar material into guide tube 2.

When the new bar is loaded, conventional means (not shown) are provided to actuate motor 25 again in regular rotation. Numeral 35 denotes another limit switch, for sensing the motor-stop position, 37 is a further limit switch for sensing a first machining position, and 41 is a cam plate for connecting and respectively disconnecting pusher rod 21 with and from chain drive 3, 5, 7. Those skilled in the art will understand the cooperation of the inventive automatic bar-feeding apparatus with the schematically shown bar machine.

Referring next to FIGS. 3, 4 and 6, 43 is a block member fixed to chain 5, having near the rear end thereof a rocker arm 49 for engaging and disengaging block member 43 with and from wing plate 19. Arm 49 is returned from its operative position indicated in FIGS. 4*b* and 8*b* at 49' to its inoperative position, as shown at 49, by means of a spring 51 after the bar material 23 is engaged with pusher rod 21.

Block member 43 further has at its front end a projecting nose 45 of which the function is to retard the acceleration of the forward movement of pusher rod 21, as well as to engage wing plate 19 in the return stroke. Pusher rod 21 is stopped at the end of its return stroke by a stop pin 53 which is spring loaded, as shown, about its rear end 55.

Referring now to FIG. 5, a cam plate 57 is fixed near the rear end of pusher rod 21 and actuates a clamping mechanism 59, 61 through a crank link mechanism 67, 73, 75, 77, 79. Clamps 59, 61 are respectively pivoted at 69, 71. Numeral 63 indicates the front end of pusher rod 21 where a recessed hole 65 is provided at the leading end of rod 21 for frictionally engaging the rear end of the bar 23.

Figure 8:
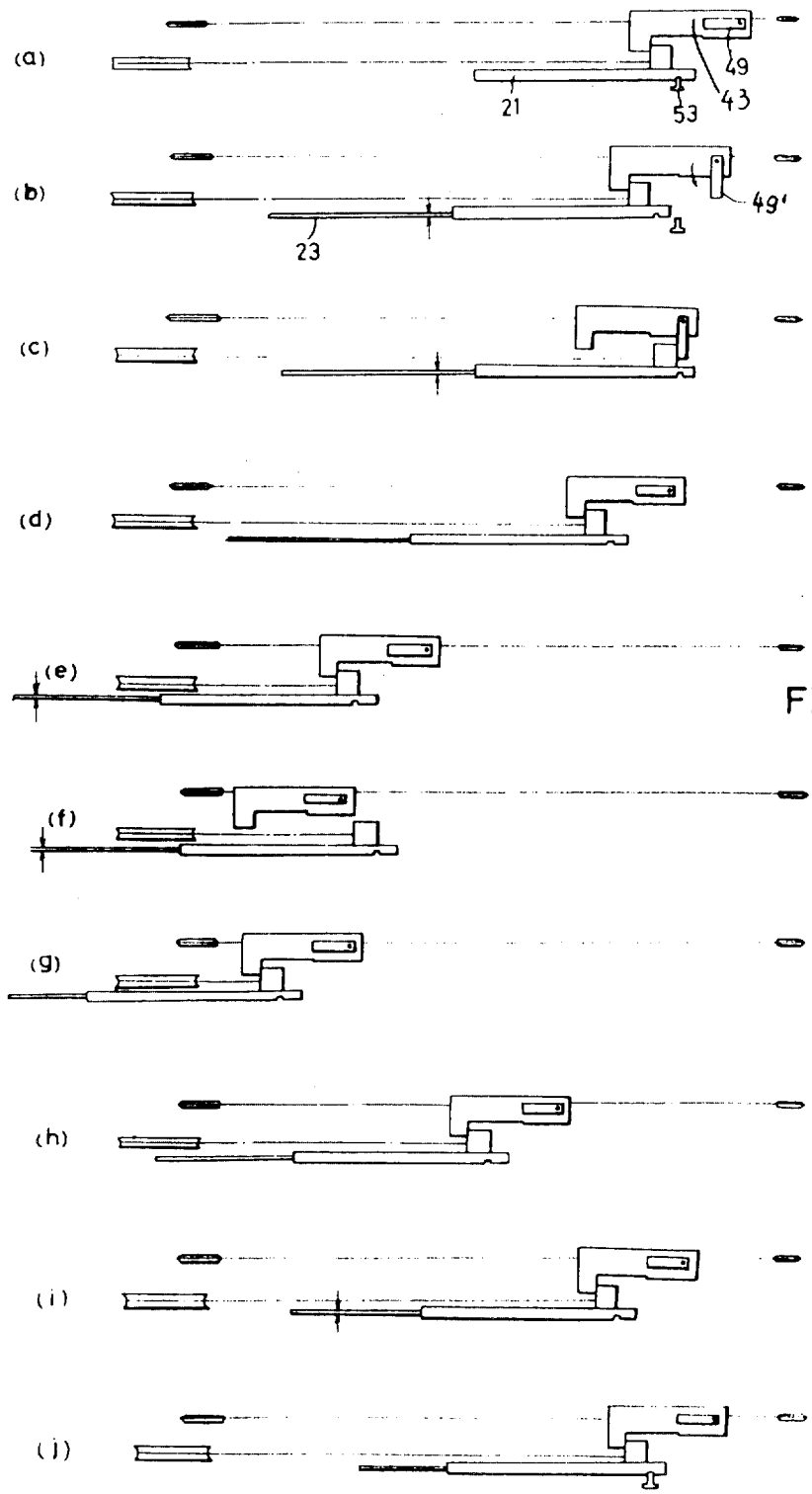
FIG. 8 is a schematic illustration of the sequence of operations of the inventive bar-feeding apparatus, with sections *a* through *j* showing successive operational phases.

The operational sequence shall now be described in the following with references to FIG. 8. At the end of the return stroke, the rear end of block member 43 actuates limit switch 33 to bring motor 25 to a complete stop, and pusher rod 21 is stopped by stop pin 53 (FIG. 8*a*).

At the same time a conventional bar loading mechanism, such as described in U.S. Pat. No. 3,419,160, is actuated to load the apparatus with new bar material in guide tube 2. Motor 25 then starts its regular rotation to advance block member 43 through chain 5. By the gravitational force of weight 9, pusher chain 21 is released from pin 53 and starts its forward movement, wing plate 19 remaining in contact with nose 45.

Cam plate 57 then actuates clamping mechanism 59, 61 through crank-link mechanism 67–79, and the bar 23 is firmly held by the clamping mechanism. At the same time the cam plate 41 actuates rocker arm 49 to swing to its operative position 49' (FIG. 8*b*). While the bar 23 and pusher rod 21 are stopped by the clamping mechanism, are 49' is advanced by chain drive 3, 5, 7, to contact and push forward wing plate 19 and forcibly engage the bar 23 into hole 65 (FIG. 8*c*).

Figure 3:
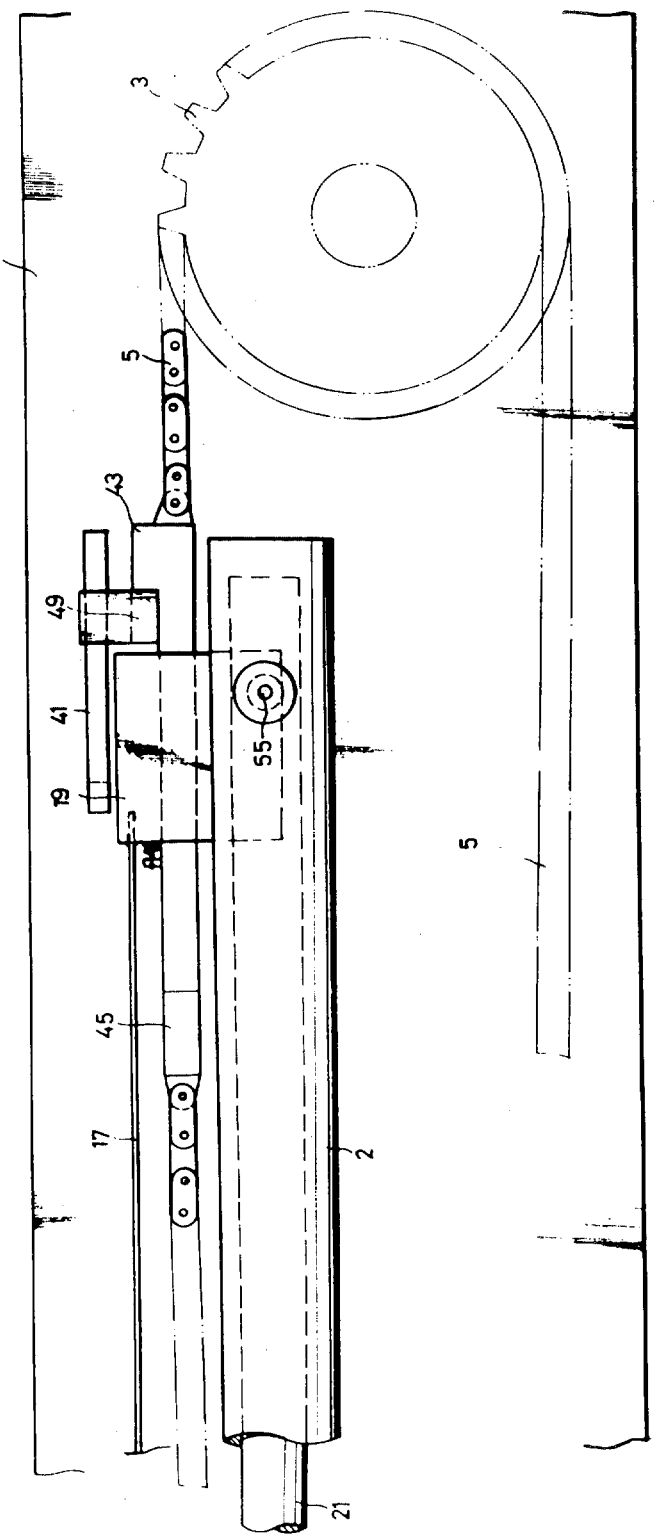
FIG. 3 is a partial side view illustrating a pusher rod at the beginning of its forward stroke when the same starts to engage a bar material.
Figure 4:
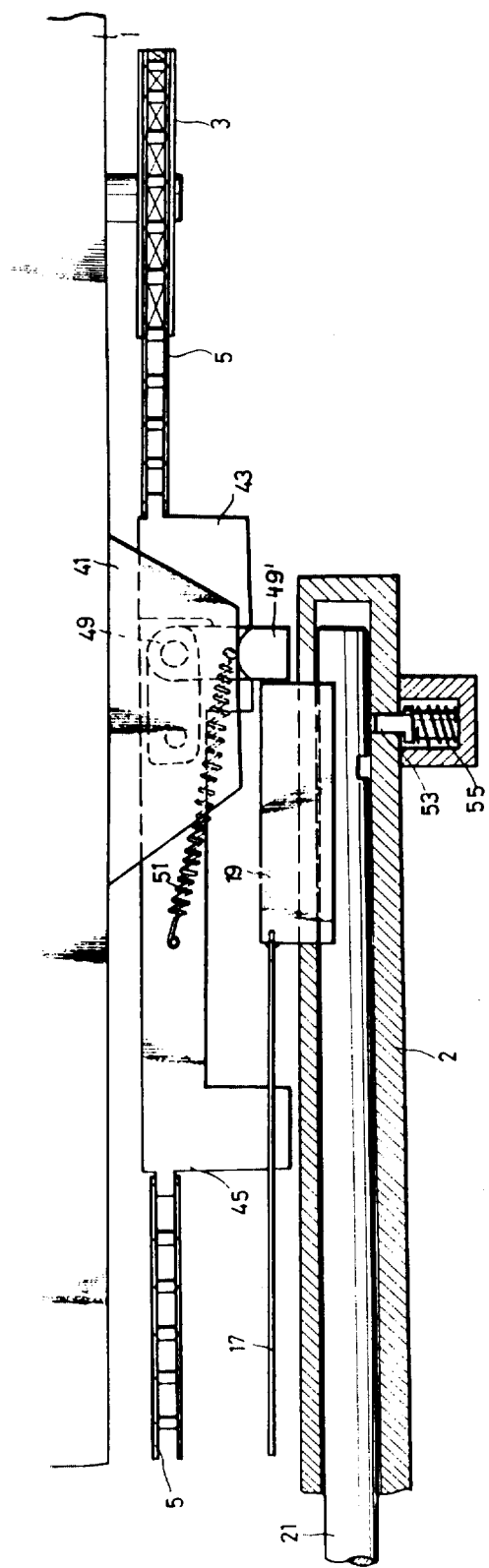
FIG. 4 is a partial plan view corresponding to FIG. 3.

FIGS. 3 and 4 illustrate the stage where wing plate 19 is held by the clamped bar and has become separated from nose 45 while arm 49' is pushing wing plate 19 to forcibly and frictionally engage the bar material with pusher rod 21.

Upon completion of the bar engagement, cam plate 57 again opens clamping mechanism 59, 61 to allow the bar 23, and accordingly pusher rod 21, to be advanced by the gravitational force of weight 9, until wing plate 19 comes in contact with nose 45. The forward movement of pusher rod 21 is then negatively governed by the movement of nose 45 (FIG. 8d).

The further movement of pusher rod 21 brings wing plate 19 into contact with limit switch 37 which sequentially sends a signal to bar machine 39 to close its chuck for further machining (FIG. 8e). It is to be noted that nose 45 allows the bar to be fed into the bar machine at a speed not faster than that of chain drive 3–7, accordingly without excessive striking shock, thus avoiding damage to the cutting tool.

During the machining operation, the advancing movement of the bar is suspended while motor 25 continuous its rotation until block 43 comes in contact with limit switch 35 at which point motor 25 is stopped (FIG. 8f).

Bar machine 39 continuously repeats its procedural machining cycle, and after every cycle the bar is advanced for one workpiece length until wing plate 19 comes in contact with limit switch 31. The latter then gives a signal to reverse motor 25, and nose 45 forces backward wing plate 19 and accordingly pusher rod 21 (FIG. 8g and h).

Near the end of the return stroke, cam plate 57 again actuates clamping mechanism 59, 61 to hold the scrap end of the machined bar while pusher rod 21 further continues its backward movement, whereby the scrap end is forcibly disengaged from recessed hole 65 (FIG. 8i and 8j). Pusher rod 21 is further driven backwards until block 43 actuates limit switch 33 to bring motor 25 to a stop, and pusher rod 21 is engaged by stop pin 53 (FIG. 8i and 8j). The apparatus is now ready for receiving the next bar and to repeat the above-described procedures.

While a preferred embodiment of the present invention is herein disclosed, it is to be understood that other types and details may also be used within the scope of the appended claims. For example, clamping mechanism 59, 61 is not an essential feature of the invention. The bar may be frictionally engaged with pusher rod 21 by conventional means, and the scrap end of the machined bar may be disengaged from the pusher rod by means of a mechanism as illustrated in FIG. 7.

In this alternative embodiment a bar 23' is frictionally engaged in a bellmouthed hole 65' provided at the front end of a pusher rod 21'. Hole 65' extends through the length of pusher rod 21' with the diameter reduced stepwise towards the rear end of the pusher rod to allow a stick 99 to be slidably mounted therein. The stick is provided with a head 91 at its front end, which fits loosely in the hole. Stick 99 is further provided at its rear end with a head 100. At the end of the return stroke of pusher rod 21', head 100 strikes against a stop (not shown) and stick 99 is moved relatively to pusher rod 21' to push out the scrap end of the machined bar 23'.

What I claim is:

1. An automatic bar-feeding apparatus for use with an automatic bar machine such as a lathe, the apparatus comprising, in combination, a motor driven chain mechanism in the lengthwise axis of the apparatus, a rocker arm member movable to and from the bar machine by means of said chain mechanism, a pusher rod mounted for longitudinal movement, adapted to perform and repeat the procedural operations of engaging the tail end of a bar material, advancing the latter toward and into the bar machine, and withdrawing the scrap end of the machined bar engaged thereon, gravitational biasing means for moving said pusher rod toward the bar machine, wherein said rocker arm member is pivotally secured to a movable member of said chain mechanism and is kept in contact with a portion of the said pusher rod in a first machining position while upon completion of the machining operation the rear end of said rocker arm member forces back said portion of the pusher rod, whereby the latter makes a return stroke together with said rocker arm member.

2. The bar-feeding apparatus as defined in claim 1, wherein said chain mechanism includes two-spaced-apart sprocket wheels, a chain passing over said wheels, and a block member forming part of said chain, and constituting said movable member to which said rocker arm member is pivotally secured.

3. The bar-feeding apparatus as defined in claim 1, further comprising an at least partly slotted guide tube for said pusher rod, and wherein said biasing means includes a wing plate secured to a portion of said pusher rod, an elongated member attached to said wing plate and a weight at the end of said elongated member for moving said pusher rod toward the bar machine.

4. The bar-feeding apparatus as defined in defined in claim 3, further comprising a biased stop pin movable in a portion of said guide tube toward and away from said pusher rod for registering engagement in a recess of the latter in its rearmost position, away from the bar machine.

5. The bar-feeding apparatus as defined in claim 1, further comprising at least one limit switch and electrical circuitry associated therewith for controlling the operation of the bar-feeding apparatus, and of the bar machine in successive phases of feeding, machining, and withdrawing the bar material.

6. The bar-feeding apparatus as defined in claim 5, including limit switch means for sensing the completion of the machining and for reversing said chain mechanism, second limit switch means for sensing the completion of the return stroke of said pusher rod, and third limit switch means for sensing a predetermined operational position of the bar-feeding apparatus.

7. The bar-feeding apparatus as defined in claim 1, wherein said movable member of the chain mechanism has a lateral nose adapted to engage said portion of the pusher rod for braking its movement toward the bar machine.

8. The bar-feeding apparatus as defined in claim 1, further comprising a pair of clamping jaws for the bar material, adapted to fixedly hold the scrap end of the bar material while said pusher rod is made to continue its return stroke by actuation of said chain mechanism, whereby the scrap end is disconnected from said pusher rod.

9. The bar-feeding apparatus as defined in claim 8, further comprising a cam plate fixed near the rear end of said pusher rod, and a crank-link mechanism interconnecting said cam plate with said clamping jaws for selectively engaging and disengaging the latter in predetermined operational positions of the bar-feeding apparatus.

10. The bar-feeding apparatus as defined in claim 8, further comprising means for (a) engaging said pusher rod by said rocker arm member when said clamping jaws fixedly hold the bar material, so as to advance said pusher rod toward the bar machine by means of said chain mechanism, whereby the bar material is engaged by said pusher rod, and thereafter (b) disengaging said rocker arm member from said pusher rod while said clamping jaws are opened, whereby said pusher rod is allowed to advance the bar material by means of said gravitational biasing means.